United States Patent [19]

Takahashi et al.

[11] Patent Number: 4,961,143
[45] Date of Patent: Oct. 2, 1990

[54] METHOD OF PREDICTING VOLCANIC ERUPTIONS

[75] Inventors: Kozo Takahashi, Higashi-Kurume; Yukio Fujinawa, Tsuchiura, both of Japan

[73] Assignees: Communications Research Laboratory, Ministry of Posts & Telecommunications, Tokyo; National Research Institute for Earth Science & Disaster Prevention, Science & Technology Agency, Tsukuba, both of Japan

[21] Appl. No.: 319,721

[22] Filed: Mar. 7, 1989

[30] Foreign Application Priority Data

Mar. 24, 1988 [JP] Japan .................................. 63-68203

[51] Int. Cl.$^5$ .............................................. G01V 3/12
[52] U.S. Cl. ..................................... 364/421; 364/420
[58] Field of Search ................ 364/420, 421; 324/344, 324/348, 323; 342/460

[56] References Cited

U.S. PATENT DOCUMENTS

| | | | |
|---|---|---|---|
| 4,390,973 | 6/1983 | Rietsch | 364/421 |
| 4,463,357 | 7/1984 | MacDoran | 342/460 |
| 4,604,699 | 8/1986 | Borcherdt et al. | 364/420 |
| 4,703,278 | 10/1987 | Nussbaum et al. | 324/344 |
| 4,837,582 | 6/1989 | Takahashi et al. | 324/344 |
| 4,904,943 | 2/1990 | Takahashi | 364/420 |

Primary Examiner—Allen MacDonald
Assistant Examiner—Ayaz Sheikh
Attorney, Agent, or Firm—Oblon, Spivak, McClelland, Maier & Neustadt

[57] ABSTRACT

The probability of a volcanic eruption is predicted by simultaneously receiving long-wave radiation signals from magma at at least four points in the vicinity of the magma, cross-correlating the received signals to detect time lags among the signals, calculating the site, magnitude and shape of the magma from the time lags, and judging the likelihood, time, scale and site of a volcanic eruption from time-course changes in the calculated site, magnitude and shape of the magma.

4 Claims, 5 Drawing Sheets

METHOD OF PREDICTING VOLCANIC ERUPTIONS

BACKGROUND OF THE INVENTION

1. Field of the Invention

This invention relates to a method of predicting volcanic eruptions, more particularly to a method of predicting volcanic eruptions in which long-wave radiation emitted from and reflected by volcanic magma is received at points in the vicinity of the volcanic magma on the earth surface, in the sea or on the seabed and the site, magnitude, time and the like of a volcanic eruption are predicted from time lags between the received long-wave radiation.

2. Prior Art Statement

Conventional techniques for predicting volcanic eruptions rely on observation of physical and chemical phenomena accompanying the movement of volcanic magma and, in particular, on the observation of volcanic earthquakes, earth crust movement, geomagnetism, gravity, electrical resistance, volcanic gas, ground water, temperature and the like.

These earlier volcanic eruption methods provide relatively accurate prediction for a limited number of volcanoes where the relationship between the measurement results and volcanic eruption has been clarified. At most volcanoes, however, prediction methods using the conventional techniques have not yet been established.

The reason for this is that at most volcanos it is not practically feasible to provide the arrangements necessary for collecting and analyzing the huge amounts of measurement data that are required for prediction by the conventional techniques.

OBJECT AND SUMMARY OF THE INVENTION

The object of this invention is to provide a method which is capable of predicting volcanic eruptions with high reliability using predictive data collected by a simpler method than those used in the conventional techniques.

For achieving this purpose, a method is provided wherein long-wave radiation from magma is simultaneously observed at at least four points located underground or on the seabed, for example, the so-received signals are cross-correlated to detect time lags (delay times) thereamong, the site, magnitude and shape of the magma are computed from the magma which is the source of the long-wave radiation and reflected radiation, and volcanic activity is predicted from time-course changes in the computed results. Thus in the present invention underground magma, which is the direct cause of volcanic eruptions, is monitored directly and continuously and volcanic activity is predicted from the location, size and movement of the magma. A particular advantage of the present method is that the activity of the magma is monitored through the medium of long-wave radiation, which enables highly reliable prediction with minimum difficulty.

The above and other features of the present invention will become apparent from the following description made with reference to the drawings.

DETAILED DESCRIPTION OF THE PREFERRED EMBODIMENT

The term "volcanic eruption" is defined to encompass the ejection of magma onto the earth's surface, ejection of rock by high-pressure underground gas, and explosion caused by underground magma coming into contact with ground or sea water. It is known that at the time of an eruption, magma of a temperature of around 1000° C. rises from a magma pool which is located several kilometers below the crater and measures about a kilometer or more in length. Because of this, if constant monitoring of the location, volume and movement of the volcanic magma should be possible, it would be possible to predict volcanic eruptions with a higher degree of precision than has been possible with the techniques available up to now.

The temperature of volcanic magma is higher than that of the surrounding crust so that the intensity of the thermal radiation and reflected long-wave radiation from the volcanic magma is greater than that from the surrounding rock. Thus if the thermal radiation and reflected radiation from the magma are received at four or more locations and the signal reception time lags are determined by cross-correlating the received signals, it becomes possible to calculate the position of the surface of the magma which is the source of the long-wave radiation and reflected radiation.

Before beginning a detailed explanation of the present invention, the meaning of the term "long waves" will defined. While the term "long waves" is widely used, it is not always used in the same meaning. In this specification the term will be used to refer to radiation of a frequency of not greater than 300 kHz. Since the crust generally has a resistivity of $10^3$–$10^5$ $\Omega$m and a refractive index of 2–4, radiation from the magma of a frequency over 300 kHz is attenuated at 0.01–1 dB/m and is therefore seldom observed near the earth surface. It is for this reason that the present invention specifies the observable radiation as long waves.

It is difficult to determine the source of long waves from magma with high accuracy by observing the same above ground since it is impossible to determine the point at which the waves will pass from the ground into the atmosphere, and even if simultaneous observation is carried out at numerous points, the precision of the determination remains poor because the long waves come along unknown mixed paths with different phase delays.

In this invention, this problem is overcome by carrying out simultaneous observation of the long waves at four or more points located underground or on the seabed, determining the signal reception time lags (delay times) by cross-correlating the received signals, calculating the site, magnitude and shape of the magma which is the source of long-wave radiation and reflected radiation, and predicting volcanic activity from time-course changes in the calculated site, magnitude and shape.

Figure 1:
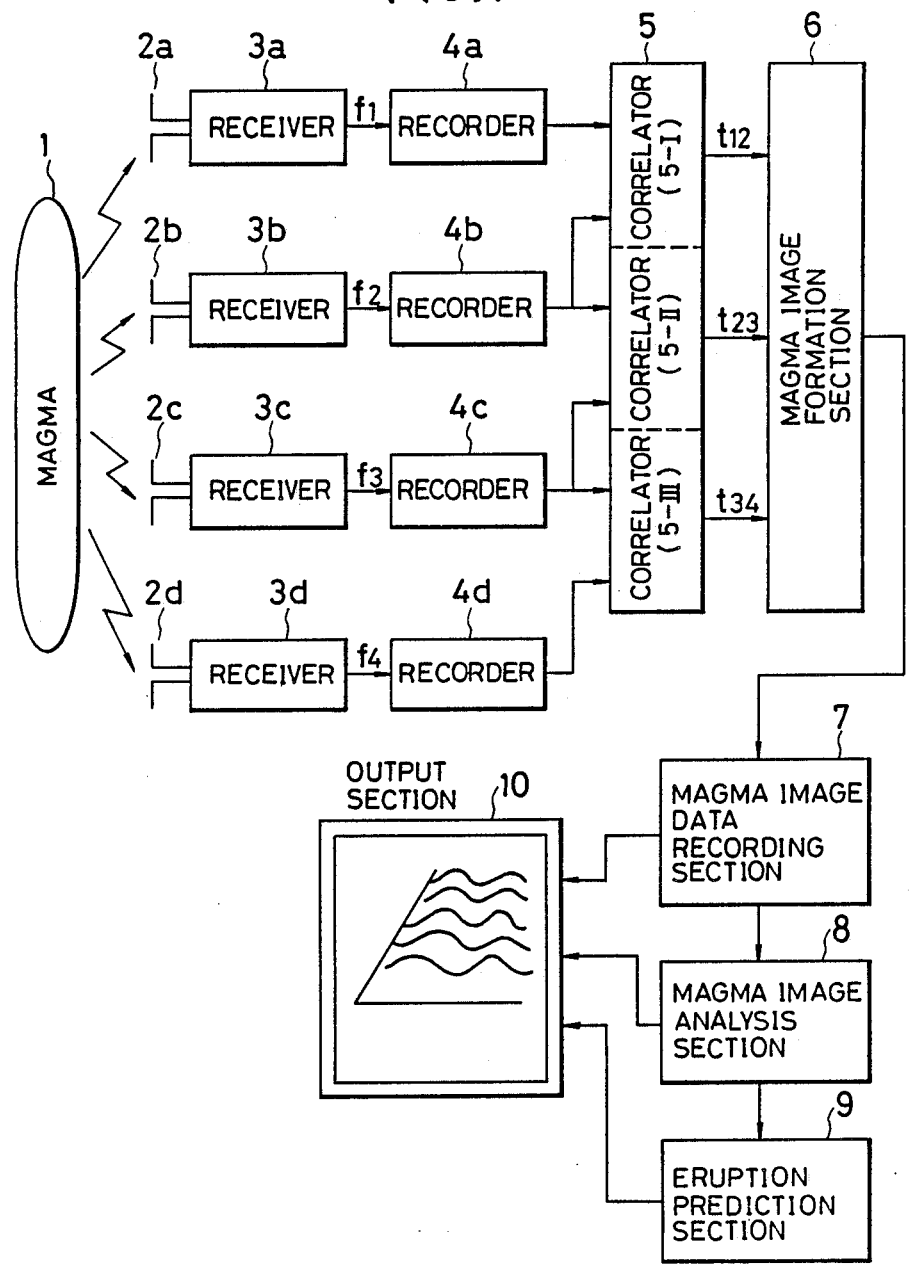
FIG. 1 is a block diagram illustrating the principle of the method of predicting volcanic eruptions according to this invention.

The principle of the present invention is illustrated in FIG. 1, in which the reference numeral 1 designates magma which has a magma image and is the subject under observation. Four observation points $P_1$, $P_2$, $P_3$, $P_4$ are established in the vicinity of the magma and provided with antennas which may, for example, be underground antennas $2a$, $2b$, $2c$, $2d$. While four observation points are set up in the embodiment under discussion, the number thereof is not limited to four and the greater the number of observation points established, the higher the precision with which the observation can be conducted. The observation points are positioned around the presumed location of the magma at intervals of about 10 km from each other.

The signals received by the antennas $2a$, $2b$, $2c$, $2d$ are forwarded to respective receivers $3a$, $3b$, $3c$, $3d$ where they are amplified. The amplified signals $f_1$, $f_2$, $f_3$, $f_4$ are sent to and recorded by recorders $4a$, $4b$, $4c$, $4d$, which may be of either analogue or digital type. The signals $f_1$, $f_2$, $f_3$, $f_4$ recorded by the recorders $4a$, $4b$, $4c$, $4d$ are sent to correlators 5 as three different signal pairs. (In the illustrated embodiment, signals $f_1$, $f_2$ are sent to correlator 5-I, signals $f_2$, $f_3$ to correlator 5-II, and signals $f_3$, $f_4$ to correlator 5-III.) The signals of the signal pairs sent to the respective correlators are cross-correlated to obtain the respective signal reception time lags (i.e. delay times) $t_{12}$, $t_{23}$, $t_{34}$, which are sent a magma image formation section 6. On the basis of the signal reception time lags $t_{12}$, $t_{23}$, $t_{34}$, the magma image formation section 6 produces a three-dimensional image of the magma, representing its site, magnitude and shape. The magma image data from the magma image formation section 6 is at prescribed intervals forwarded as time series data to a magma image data recording section 7 where it is recorded. The magma image data received by the magma image data recording section 7 is sent to a magma image analysis section 8 where it is used for analysis of time-course changes in the magnitude, site and shape of the magma image. The resulting magma image analysis data is sent to an eruption prediction section 9, which produces an eruption warning when an abnormality is detected.

The data from the magma image data recording section 7, the magma image analysis section 8 and the eruption prediction section 9 are sent to an output section 10 which as the occasion requires outputs the current magma image, a past magma image, information on time-course changes in the magma image, eruption prediction information, or the like.

The aforesaid correlators 5, the magma image formation section 6, the magma image data recording section 7, the magma image analysis section 8, the eruption prediction section 9 and the output section 10 can be constituted within a computer.

The magma observation method will now be explained.

In the present invention, the magma is considered to be a collection of long-wave signal sources and a three-dimensional magma image is obtained by determining the location of the individual wave sources.

The wave source under observation is defined as Q and the observation points as $P_i$, $P_j$ ($i \neq j$, i. j = 1, 2 ..., n. $n \geq 4$). (See FIG. 4.) The long waves are simultaneously received at the two different observation points $P_i$, $P_j$ separated from each other by about 10 km. Defining the received signals (amplitude and phase information at time t) as $f_i$ (FIG. 2(a)) and $f_j$ (FIG. (b)), the cross-correlation function $\gamma_{ij}$ can be represented as $$\gamma_{ij}(\delta t) = \int_T f_i(t + \delta t) f_j(t) dt \quad (1)$$

where the integration period T is the time duration over which the waves are received.

Next, the value $t_{ij}$ of $\delta t$ when $\gamma_{ij}(\gamma t)$ is maximal is found. (If there are two or more wave sources, there will be two or more values of $t_{ij}$ at which $\gamma_{ij}(\delta t)$ becomes maximal.) More specifically, the value $t_{ij}$ of $\delta t$ satisfying the following relationship is found $$d\gamma_{ij}(\delta t)/d\delta t = 0 \quad (2)$$

$$d^2\gamma_{ij}(\delta t)/d\delta t^2 < 0$$

Let the mean velocity of long waves within the crust be c and the distances $QP_i$, $QP_j$ be $r_i$, $r_j$, respectively, and it follows that $$r_i - r_j = c t_{ij} \quad (3)$$

Equation (3) represents a rotational hyperboloid of two sheets having its foci at $P_i$, $P_j$. (See FIG. 3.)

Figure 3:
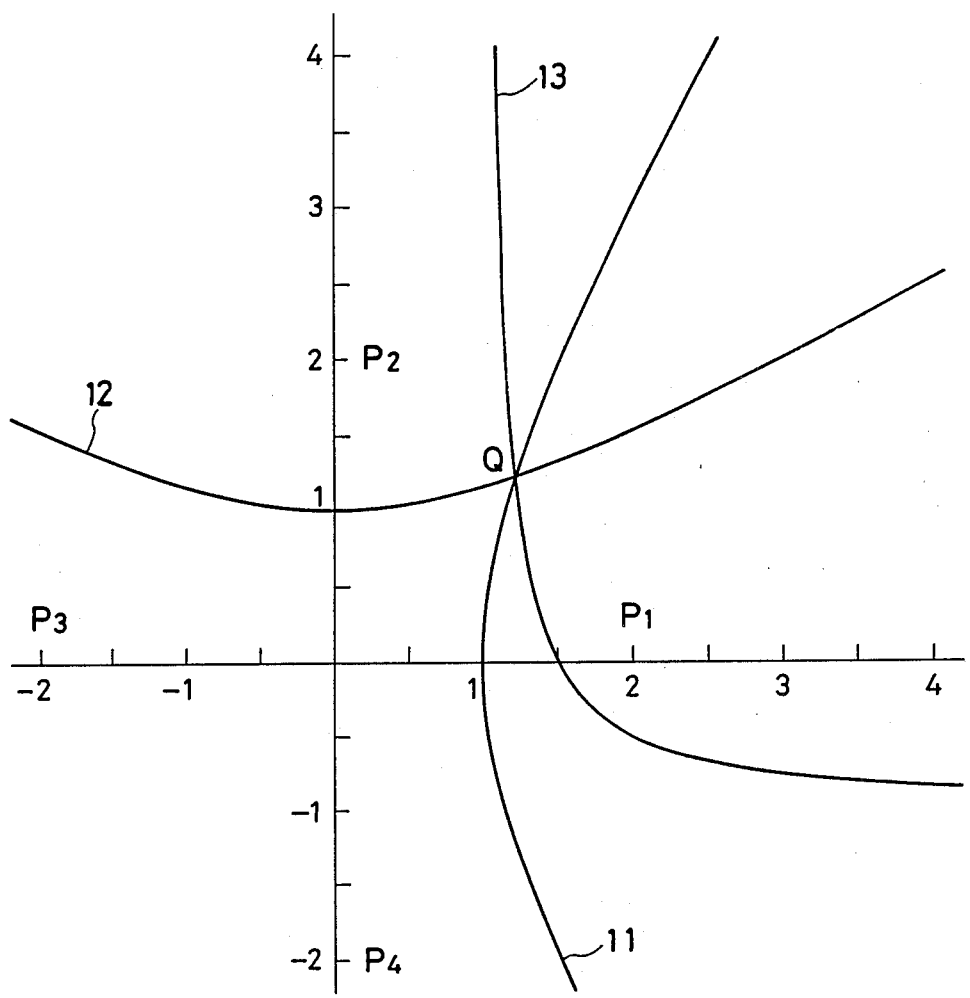
FIG. 3 is a graph for explaining a method for computing the location of a wave source Q.

When n is four or greater, there are three or more independent equations (3) and the wave source Q is determined by the common point of intersection among these independent hyperboloids. (See FIG. 3.) FIG. 3 relates to a case in which long waves from the magma are received simultaneously at four points $P_i$ (i = 1, 2, 3, 4) and illustrates the principle by which the wave source Q is found as the point of intersection of three hyperboloids having their foci at $P_i$. Reference numeral 11 indicates the line of intersection between a hyperboloid having $P_1$, $P_3$ as its foci and a plane including the projections of $P_1$, $P_2$, $P_3$, $P_4$ (this line of intersection being referred to as a hyperbola hereinafter), 12 indicates a hyperbola having $P_2$, $P_4$ as its foci, and 13 indicates a hyperbola having $P_1$, $P_4$ as its foci.

Figure 2A:
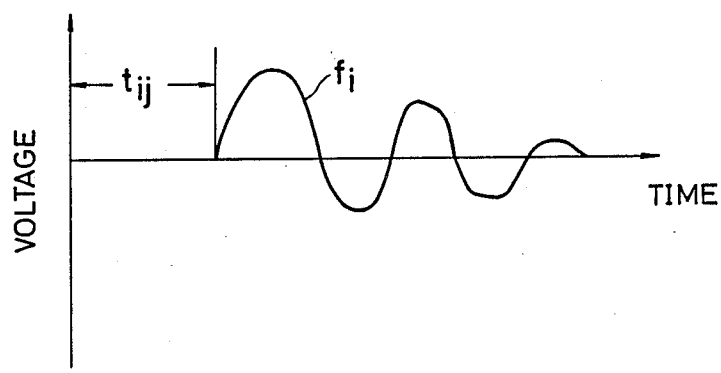
FIG. 2(a) and (b) are waveform diagrams for explaining the time lag $t_{ij}$ between two signals $f_i$ and $f_j$ received at observation points $P_i$ and $P_j$, respectively.
Figure 2B:
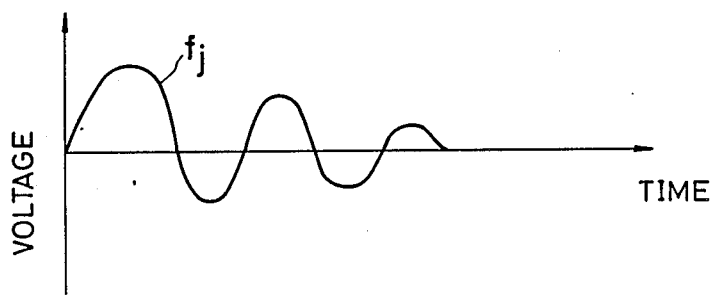

When the waveform of the signal received at the signal received at observation point $P_j$ is as shown in FIG. 2(b), $\gamma(\delta t)$ becomes maximal when $\delta t$ in equation (3) is equal to $t_{ij}$ in FIG. 2(a). When $ct_{31} = ct_{32} = ct_{41} = 1$, equation (3) becomes $$r_3 - r_1 = 1 \quad (4)$$

$$r_4 - r_2 = 1 \quad (5)$$

$$r_4 - r_1 = 1 \quad (6)$$

When Q, $P_i$ (i = 1, 2, 3, 4) are in the same plane and $P_1$, $P_2$, $P_3$, $P_4$ are respectively (2,0), (0,2), (−2,0), (−2,−2), the lines of intersection between the hyperboloids of equations (4)–(6) and the aforesaid plane become the hyperbolas 11–13 of FIG. 3. When represented on a cartesian coordinate system, the hyperbolas 11–13 become as shown by the following equations:

$$x^2 - y^2/3 = 1 \quad (4')$$

$$-x^2/3 + y^2 = 1 \quad (5')$$

$$2xy + 2x - 2y = 3 \quad (6')$$

The intersection of the hyperbolas 11, 12, 13 is the wave source Q and value $$(\sqrt{1.5}, \sqrt{1.5})$$

obtained by analytically solving the equations (4')–(6') is also Q.

By continuously carrying out the aforesaid observation and computation, it becomes possible to represent a three-dimensional image of the wave source region as a function of time.

In the conventional technology, the error in calculating the site of the wave source is around 50 km and since this is approximately the same size as wave source region, it is not possible by the prior art method to determine the three-dimensional distribution of the wave sources. On the other hand, since the present invention uses long waves, which are subject to only slight attenuation and multiple reflection within the crust, the main portion of the error after elimination of statistical error arising from error in the mean long-wave velocity c is the calculation error component $\Delta t_{ij}$ of $t_{ij}$. Where the observation bandwidth of the long waves is, for example, 8 kHz, $\Delta t_{ij}$ can be held to not more than $10^{-5}$s. Since the mean velocity c of long waves within the crust is about $10^8$ m/s, the error in $ct_{ij}$ becomes about 1 km provided that the aforesaid error relating to the mean velocity c is ignored. In other words, the relative error in determining the site of the wave source is about 1 km. With a relative error of only 1 km, it is possible to visualize the wave source region. That is, it is possible by conducting continuous observation at four underground or seabed points to obtain a three-dimensional magma image (of the upper half-surface).

Figure 4:
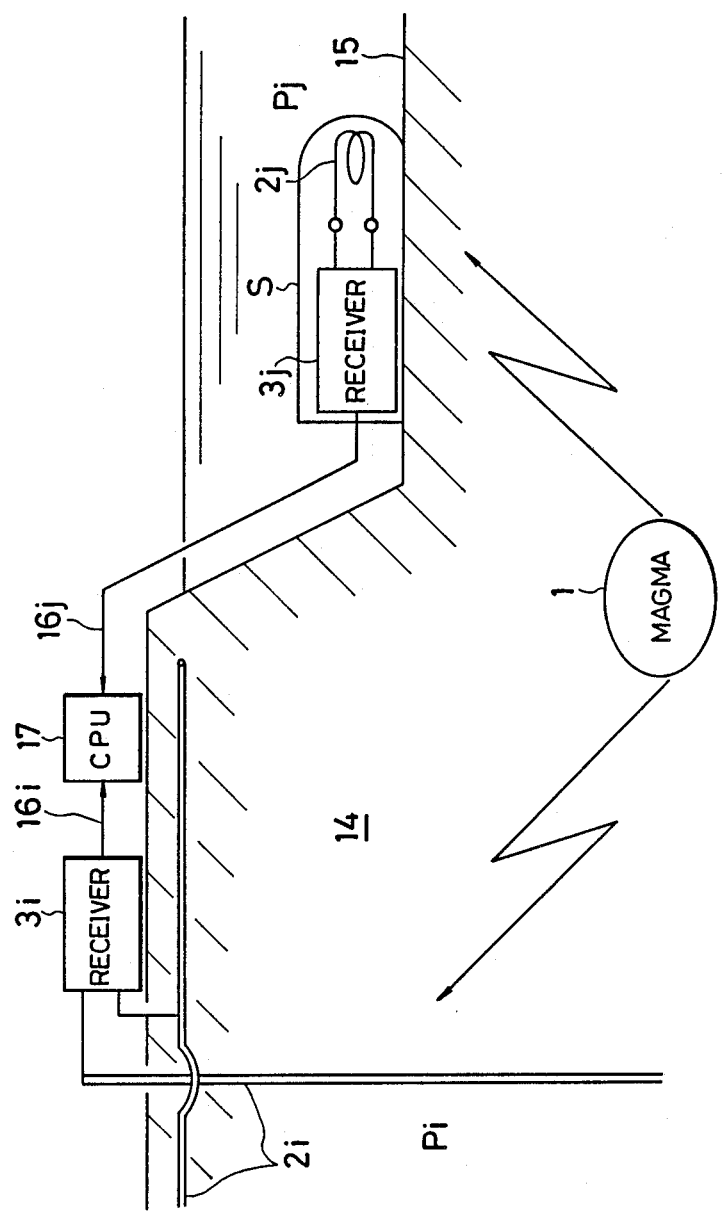
FIG. 4 is a schematic view showing the manner in which antennas are disposed.

FIG. 4 shows a concrete example of how the antennas are disposed at the observation points. On land, a monopole antenna 2i consisting of a linear element and a reflector is disposed with the linear element extending into the earth to a depth of 1,000 m or more by, for example, utilizing a deep well or the like. The reflector is typically disposed to radiate from the linear element at the center.

The linear element is normally a conductive cable. However, if the deep well has a conductive casing, this can be used instead. The reflector is usually constituted using conductive wire or plates, but can instead be constituted using existing underground water and gas pipes. The radius of the reflective surface of the reflector as measured from the linear element at the center should preferably be longer than the linear element embedded in the earth. The reflector serves to prevent radiation in the atmosphere (atmospherics) from entering the earth and to reflect radiation from within the earth. In view of its purpose, it can be provided on the earth's surface but should be buried an appropriate depth underground if there is any danger of it being damaged by humans or animals. The long-wave signals received by the antenna 2i are amplified by a receiver 3i and sent to a central processing unit (CPU) 17 via a cable 16i.

When the observation point is on the seabed, a sensor S consisting of a dipole or loop antenna 2j and a receiver 3j is disposed at the observation point on the seabed 15. When the dipole antenna is used, it is preferable that the insulated conductive cables constituting the linear elements thereof be laid on the seabed so as to extend in four directions, thus providing two dipole antennas that are normal to each other. The sensor S should be disposed at a depth of 500 m or more so as to ensure that noise radiation entering via the sea surface will be adequately attenuated before reaching it. The long-wave signals received by the antenna 2j are amplified by a receiver 2j and sent to the CPU 17 via a cable 16j.

Figure 5:
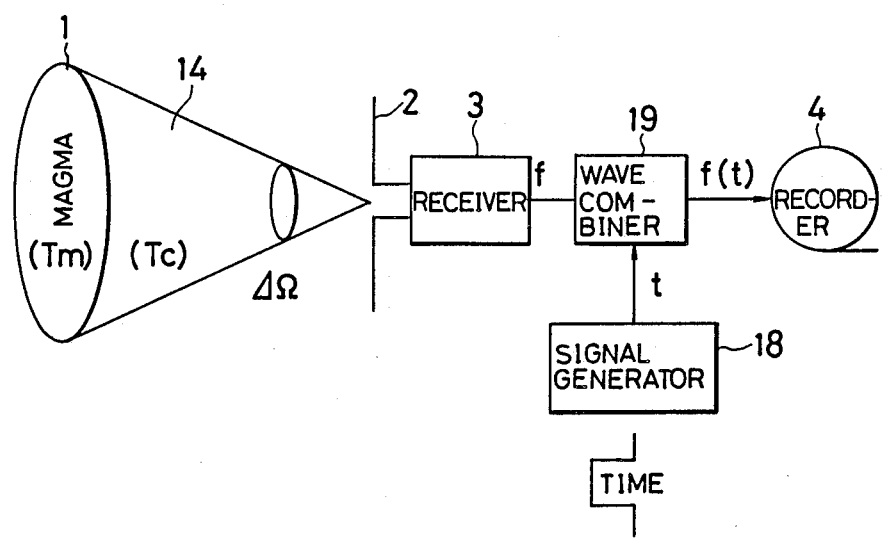
FIG. 5 is a block diagram showing the steps for processing a long-wave radiation signal between its reception at an antenna and the time it is recorded in a recorder.

Referring to FIG. 5, assuming that magma 1 of a temperature $T_m$ (expressed in degrees kelvin; hereinafter the same) is present in the crust 14 of temperature $T_c$, the observed temperature $T_b$ as observed by the antenna 2 will be $$T_b = \alpha t_m + (1-\alpha)T_c \quad (7)$$

where $\alpha$ is the radiation attenuation between the magma 1 and the antenna 2 ($0 \leq \alpha \leq 1$).

Presuming that the antenna 2 is nondirectional, the output of the antenna 2 ($=kT_aB$, where k is Boltzmann's constant and B is the bandwidth) corresponding to the antenna temperature $T_a$ is $$\begin{aligned} T_a &= \Delta\Omega/4\pi \cdot T_b + (4\pi - \Delta\Omega)/4\pi \cdot T_c \\ &= \Delta\Omega/4\pi \cdot (T_b - T_c) + T_c \end{aligned} \quad (8)$$

where $\Delta\Omega$ is the solid angle (steradian) of the magma 1 as seen from the antenna 2.

Since only the first term on the right side of equation (8), $\Delta\Omega/4\pi \cdot (T_b - T_c)$, is the temperature corresponding to the radiation (signal) from the magma 1, the signal temperature $T_{sig}$ corresponding to the received signal power is $$\begin{aligned} T_{sig} &= \Delta\Omega/4\pi \cdot (T_b - T_c) \\ &= \Delta\Omega/4\pi \cdot \alpha(T_m - T_c) \end{aligned} \quad (9)$$

On the other hand, the signal reception limit can be represented as $$\Delta T_{min} \approx T_{sys}/\sqrt{BT} \quad (10)$$

where
$\Delta T_{min}$: minimum detectable temperature
$T_{sys}$: system temperature
B: received signal frequency bandwidth before detection (Hz)
T: integration time after detection (s)

Where the same signal is received at two different locations using antennas and receivers of identical performance, the correlation amplitude (presuming that, among all received data, the ratio of the signal portion for which a correlation can be obtained to the whole signal is S/(S+N)) can be expressed as $$\tau = T_{sig}/(T_{sig} + T_{sys}) \quad (11)$$

provided that where reception is conducted at two points, this equation gives the value for the case where the half beamwidth of the interferometer constituted by the two antennas is smaller than the visual angle of the magma viewed from the antennas.

Let the signal received from $P_i$ be $f_i(t)$ and the signal received from $P_j$ be $f_j(t)$ (see FIG. 6), then $\delta t$ at the time when $$\int_0^{T-\delta t} f_i(t + \delta t) f_j(t) dt$$

becomes maximal or when $$\int_0^{T-\delta t} \{f_i(t + \delta t) - f_j(t)\}^2 dt$$

becomes minimal is the time lag $t_{ij}$ between the signals.

Figure 6:
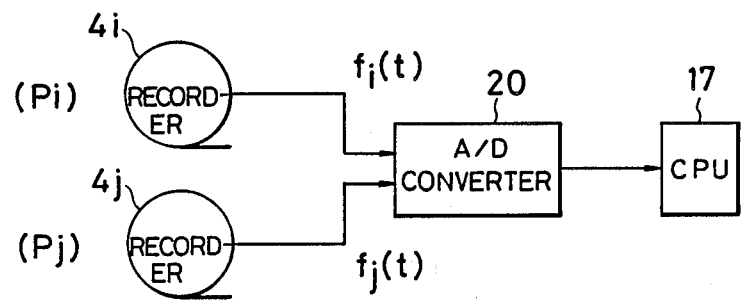
FIG. 6 is a block diagram showing the steps for processing a recorded signal up to the point of predicting volcanic activity.

For carrying out the aforesaid computation in the CPU 17 of FIG. 6, a time signal t from a time signal generator 18 is added to the signal f from the magma 1 in FIG. 5 by a wave combiner 19, enabling the signal f to be treated as a function f(t) of time t. If the CPU 17 is capable of processing only digital signals, the aforesaid f(t) is digitized by the A/D converter 20 shown in FIG. 6.

When observation is conducted from four or more points to obtain three or more independent time lags $t_{ij}$, it becomes possible, as explained in the foregoing, to determine the site Q of the magma surface as the point of intersection of three or more independent hyperboloids having the observation points $P_i$, $P_j$ as their foci.

The calculation error in determining the position of the magma surface in accordance with this invention is fairly large in terms of absolute value because the mean velocity c of long waves traveling through the crust is assumed to be constant. However, the relative error is not appreciably affected by the mean velocity c and is therefore relatively small. Thus changes in the site, magnitude and shape of the magma can be ascertained with relatively high accuracy and these changes can be used for predicting volcanic eruptions with good precision using conventional methods.

In the equations (7)–(11), the variables assume the following typical values.

| | | |
|---|---|---|
| Magma temp. | $T_m = 1300$ K | (12) |
| Crust temp. | $T_c = 300$ K | (13) |
| Long-wave attenuation | $\alpha = 0.01$ (20 dB) | (14) |
| Magma solid angle | $\Delta\Omega = 0.01 \times 4\pi$ | (15) |
| System temp. | $T_{sys} = 600$ K | (16) |
| Bandwidth | $B = 8$ kHz | (17) |
| | (Reception band: 1–9 kHz) | |
| Integration time | $T = 4500$ s | (18) |
| Substituting Equations (12)–(14) in Equation (7) gives | | |
| Observed temperature | $T_b = 310$ K | (7)' |
| Substituting Equations (7)', (13), (15) into Equation (8) gives | | |
| Antenna temp. | $T_a = 300.1$ K | (8)' |
| Substituting Equations (12)–(15) into Equation (9) gives | | |
| Signal Temp. | $T_{sig} = 0.1$ K | (9)' |
| Substituting Equations (16)–(18) into Equation (10) gives | | |
| Min. detectable temp. | $T_{min} = 0.1$ K | (10)' |
| Substituting Equations (9)', (16) into Equation (11) gives | | |
| Correlation amplitude | $\rho = 0.017\%$ | (11)' |

From the above calculation examples, when $T_m$, $T_c$, $T_{sys}$, T assume the above values, it is clear that the magma can be detected and the correlation amplitude at this time is 0.017% or greater if $$\alpha\Delta\Omega \geq 4\pi \times 10^{-4}$$

If the magma is within 10 km from the observation points $P_i$, $P_j$ and has a radius of not less than 2 km, $\alpha\Delta\Omega \geq 4\pi \times 10^{-4}$ is satisfied, and if the specific resistance of the crust is $10^5$ $\Omega$m or greater, $\alpha \geq 0.01$ is also satisfied. Where the distance between the observation points $P_i$, $P_j$ is set at about 10 km and time lag $t_{ij}$ between the signals $f_i$, $f_j$ is detected with a precision of $10^{-5}$ s, then since the velocity of long waves within the crust is about $10^8$ m/s, the site of the magma can be calculated to an accuracy of about 1 km.

While FIGS. 5 and 6 show an example in which the received signals are recorded in analogue form, it is also possible to record them in digital form. If they are recorded digitally, the A/D converter 20 becomes unnecessary.

The long waves received by the antenna 2 are not limited to the thermal long-wave radiation produced by the magma but may also include artificial and natural noise long-wave radiation reflected from the magma and/or reflected long waves produced by deliberately transmitting long waves in the direction of the magma.

In the present invention, the site, magnitude and movement of the magma liable to cause a volcanic eruption are first observed and the likelihood of a volcanic eruption is then predicted based on the results of this observation. Specifically, the scale of the eruption is predicted from the magnitude of the magma, the site of the eruption is predicted from the direction of movement of magma near the earth surface, and the time of the eruption is predicted from the distance of the magma from the earth surface and its speed of movement. The invention can thus effectively predict volcanic eruptions of all types, including those on the sea bottom.

What is claimed is:

1. A method of predicting volcanic eruptions comprising the steps of simultaneously receiving long-wave radiation signals from magma at at least four points in the vicinity of the magma, cross-correlating the received signals to detect time lags among the signals, calculating the site, magnitude and shape of the magma from the time lags, and predicting the likelihood of a volcanic eruption from time-course changes in the calculated site, magnitude and shape of the magma.

2. A method according to claim 1, wherein the long-wave radiation signals from the magma are long waves radiated by the magma.

3. A method according to claim 1, wherein the long-wave radiation signals from the magma are long waves reflected by the magma.

4. A method according to claim 1, wherein said at least four points are separated from each other by about 10 km.

* * * * *